(12) United States Patent
Yamamoto et al.

(10) Patent No.: US 9,484,060 B2
(45) Date of Patent: Nov. 1, 2016

(54) ENCODER

(71) Applicant: CANON KABUSHIKI KAISHA, Tokyo (JP)

(72) Inventors: Takeshi Yamamoto, Fujisawa (JP); Norihiro Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 14/461,235

(22) Filed: Aug. 15, 2014

(65) Prior Publication Data
US 2015/0049596 A1 Feb. 19, 2015

(30) Foreign Application Priority Data

Aug. 19, 2013 (JP) ................... 2013-169806
Sep. 3, 2013 (JP) ................... 2013-181856

(51) Int. Cl.
*G05B 19/29* (2006.01)
*G11B 20/10* (2006.01)
*G01D 5/244* (2006.01)
*G11B 20/12* (2006.01)

(52) U.S. Cl.
CPC .......... *G11B 20/10* (2013.01); *G01D 5/24461* (2013.01); *G11B 2020/1264* (2013.01)

(58) Field of Classification Search
CPC ............... B65H 2553/51; H02P 6/16; G11B 2020/1264; G11B 20/10; G11B 7/0953; G11B 7/00456
USPC ............... 318/602, 603, 560, 565, 652, 671, 318/400.13, 400.4, 437, 467; 250/231.14, 250/231.16, 231.18, 397, 398; 369/30.13, 369/30.14, 30.18, 30.27, 43, 44.17, 44.25
See application file for complete search history.

(56) References Cited

U.S. PATENT DOCUMENTS

| 4,774,446 A * | 9/1988 | Salazar ............ G07B 17/00467 101/233 |
| 4,803,354 A * | 2/1989 | Onodera ............ G01D 5/24452 250/231.16 |
| 5,021,781 A * | 6/1991 | Salazar ................ G05B 19/231 318/561 |
| 5,210,562 A * | 5/1993 | Miyazawa ................ G02B 7/28 318/603 |
| 5,331,262 A * | 7/1994 | Francisco ............ G05B 19/416 318/452 |
| 6,407,683 B1 * | 6/2002 | Dreibelbis .......... H03M 1/0626 318/560 |
| 6,917,034 B2 * | 7/2005 | Iino ........................ H02N 2/142 250/231.13 |
| 7,091,884 B2 * | 8/2006 | Rio Doval ......... G01D 5/24476 250/231.18 |
| 7,375,487 B2 * | 5/2008 | Miyashita ............... H02P 6/165 318/602 |
| 7,994,749 B2 * | 8/2011 | Miyashita ............... G01D 5/145 318/638 |
| 8,173,951 B2 * | 5/2012 | Takahashi ................ G01D 5/38 250/231.16 |
| 8,587,170 B2 * | 11/2013 | Caliendo ................ H02K 7/116 310/68 B |
| 2003/0052287 A1 | 3/2003 | Iino et al. |
| 2010/0072348 A1 | 3/2010 | Takahashi |

FOREIGN PATENT DOCUMENTS

JP 4274751 B2 6/2009

\* cited by examiner

*Primary Examiner* — Bentsu Ro
*Assistant Examiner* — Thai Dinh
(74) *Attorney, Agent, or Firm* — Canon USA, Inc. I.P. Division

(57) ABSTRACT

An encoder that detects a position of a movable body from an origin includes a signal generation unit configured to generate an incremental signal and an origin candidate signal by using A-phase and B-phase voltages obtained from an orthogonal signal pattern, a reference position detection unit configured to detect a reference position signal by using a Z-phase voltage obtained from a reference position signal pattern, and a counter configured to reset a counted value of the incremental signal on the basis of the origin candidate signal.

11 Claims, 19 Drawing Sheets

ENCODER

BACKGROUND OF THE INVENTION

1. Field of the Invention

The present invention relates to an encoder. Specifically, the invention relates to a system for a scale having an incremental channel and a reference mark channel and a reading head. Furthermore, the invention provides an encoder that can perform high-speed origin position detection based on a reference mark.

2. Description of the Related Art

Up to now, an encoder configured to measure a relative position of two members including a scale and a reading head has been provided with a scale on one member which includes a scale line and a reading head provided on the other member.

An optical scale reading apparatus includes an irradiation unit configured to irradiate a scale with light and a detection unit configured to measure and output a displacement of the relative position of the reading head in accordance with a reflection pattern generated by the scale irradiation.

A scale having marks in a periodic pattern is an incremental scale and generates an orthogonal signal on the basis of the periodic pattern of the incremental scale. A reference mark is provided in this scale, and an incremental counter is reset in a case where the reading head detects the reference mark.

Accordingly, the relative position of the two members can be confirmed.

In a system of a large number of encoders in the related art, a configuration in which an origin detection pattern of the scale is detected by moving a movable part to reset the incremental counter is adopted.

In an encoder disclosed in Japanese Patent No. 4274751, an origin signal is output in synchronism with an orthogonal signal.

However, the above-described encoders in the related art have the following problems.

That is, detection timings for the signal from the origin detection pattern and the orthogonal signal are shifted by a relative speed of the scale and the reading head, and for example, the position of the origin may be shifted in a case where the origin is detected at a low speed and a case where the origin is detected at a high speed. In that case, a relative value between the scale and the signal reading head has an error.

The present invention has been made in view of the above-described problems and provides an encoder that can stably perform origin detection even in a case where the origin detection is performed at a high speed and a movable body that can perform origin reset at a high speed.

SUMMARY OF THE INVENTION

An encoder that detects a position of a movable body from an origin according to an aspect of the present invention includes:

a signal generation unit configured to generate an incremental signal and an origin candidate signal by using A-phase and B-phase voltages obtained from an orthogonal signal pattern;

a reference position detection unit configured to detect a reference position signal by using a Z-phase voltage obtained from a reference position signal pattern; and a counter configured to reset a counted value of the incremental signal on the basis of the origin candidate signal.

Further features of the present invention will become apparent from the following description of exemplary embodiments with reference to the attached drawings.

DESCRIPTION OF THE EMBODIMENTS

An encoder according to exemplary embodiments of the present invention determines an origin from a plurality of origin candidate signals which are generated in accordance with a position or an angle of a movable body from an orthogonal signal by detecting a reference position signal in a case where the movable body is at a predetermined position. The encoder includes a counter configured to reset a counted value of an incremental signal by the origin candidate signals, so that high-speed origin detection can be performed, and it is also possible to provide an origin reset method for an encoder with which origin reset can be performed at a high speed.

EXEMPLARY EMBODIMENTS

Hereinafter, exemplary embodiments of the present invention will be described.

First Exemplary Embodiment

As a first exemplary embodiment, an encoder to which the present invention is applied will be described by using the drawings.

First, an example configuration of the encoder according to the present exemplary embodiment will be described by using FIG. 5.

Figure 5:
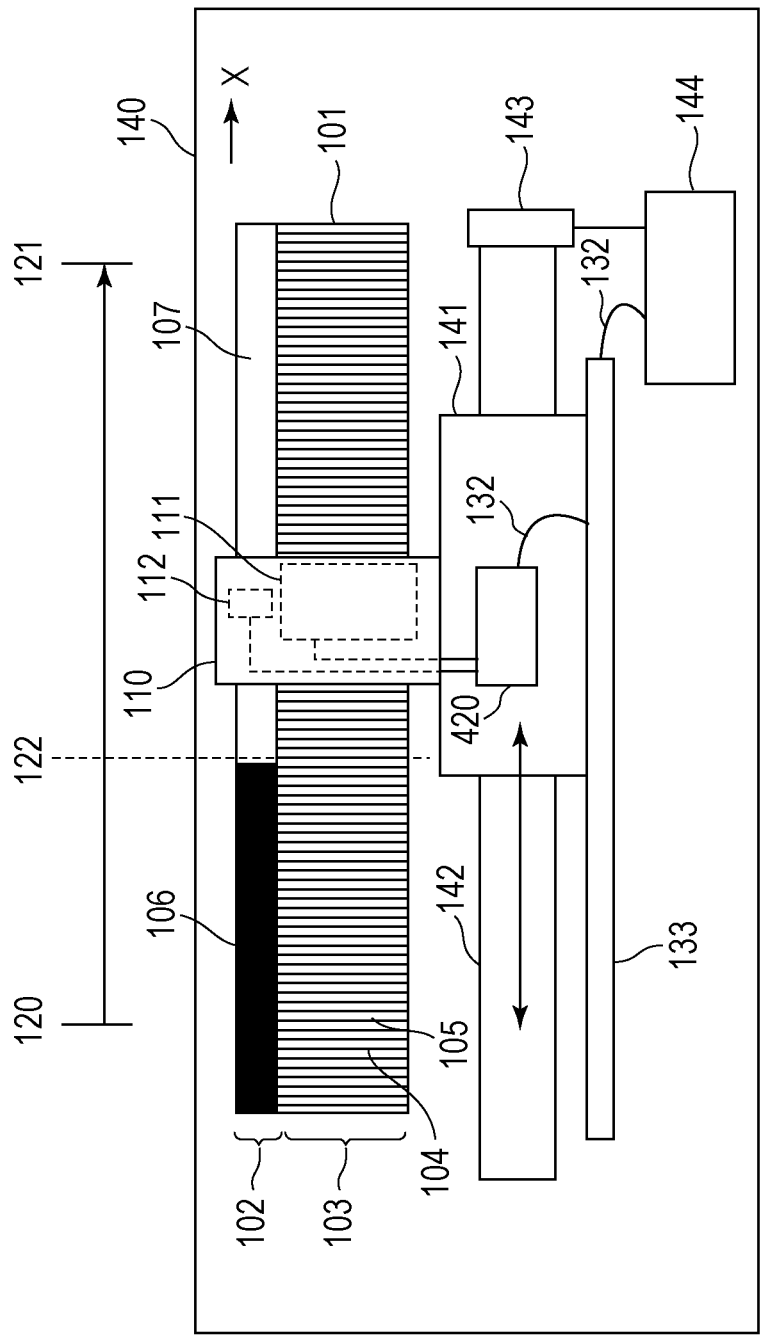
FIG. 5 is a schematic configuration diagram for describing an example configuration of the encoder according to the first exemplary embodiment of the present invention.

In FIG. 5, a scale 101 and a reference position signal pattern 102 configured to generate a reference position signal are illustrated.

A non-reflective section 106 that is a part of the reference position signal pattern and a reflective section 107 that is similarly a part of the reference position signal pattern are also illustrated.

An orthogonal signal pattern 103 in which a bright and dark pattern used to generate an orthogonal signal is formed, a bright section 104 that is a part of the orthogonal signal pattern, and a dark section 105 that is also a part of the orthogonal signal pattern are also illustrated.

A signal reading head 110, an orthogonal signal detection unit (orthogonal signal generation unit configured to generate an orthogonal signal in accordance with a displacement of a position or an angle of a movable body) 111, and a reference position signal detection unit (reference position detection unit configured to detect a reference position signal in a case where the movable body is at a predetermined position) 112 are also illustrated.

The scale 101 is fixed, and the signal reading head 110 is fixed to a carriage (movable body) 141 functioning as a movable part. For example, a part (not illustrated) can be mounted on the carriage 141, and the carriage 141 can be moved by an actuator 143 via a guide rail 142 in an X direction.

An encoder controller 420 includes an orthogonal signal pulse wave generation unit.

The encoder controller 420 may be provided with a comparison unit 421, a ΔCZ counter 422, a current position generation unit 423 in addition to an A-phase pulse wave generation unit and a B-phase pulse wave generation unit corresponding to an incremental signal generation unit (orthogonal encoder) in FIG. 1, which will be described below.

The signal reading head 110 is electrically connected to the encoder controller 420 and connected to a stage controller 144 via the cable 132, and the actuator 143 is driven on the basis of a controlled driving current from the stage controller 144.

Operating limit positions 120 and 121 of the signal reading head 110 are also illustrated. A reference position 122 serves as a boundary position between the non-reflective section 106 and the reflective section 107 of the reference position signal pattern 102. A configuration is adopted in which a cable 132 is arranged inside Cableveyor (registered trademark) 133, and even when the carriage 141 is moved, an encoder controller 134 and the stage controller 144 can keep a connected state.

Figure 6A:
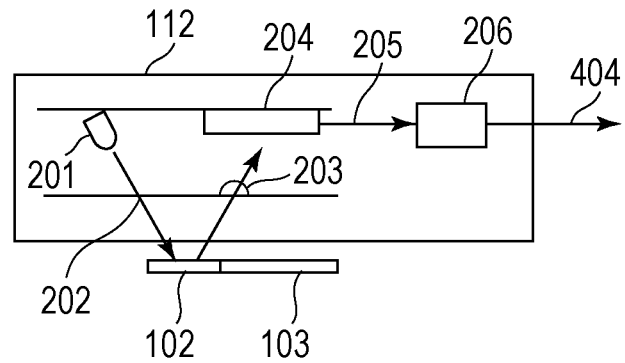
FIGS. 6A to 6C are schematic configuration diagrams of a reference position detection unit of the encoder according to the first exemplary embodiment of the present invention.

FIG. 6A is a schematic diagram for describing a reading unit for the reference position signal pattern.

Light emitted from a light source 201 provided to irradiate the scale 101 with light is reflected by the scale 101 and introduced to a detector 204 by a lens 203 or another appropriate optical part, and the detector 204 outputs the size of the quantity of the introduced light as a voltage.

Figure 6B:
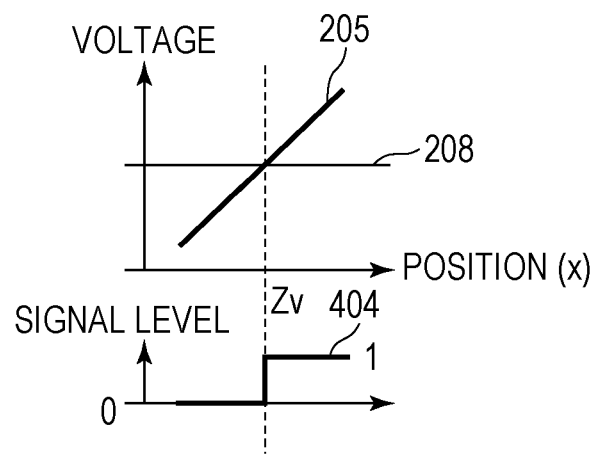

As illustrated in FIG. 6B, since a voltage output from the detector 204 changes depending on a relative position of the signal reading head 110 and the scale 101, a reference position signal 404 is output when a voltage 205 from the detector 204 reaches a certain threshold 208.

Figure 6C:
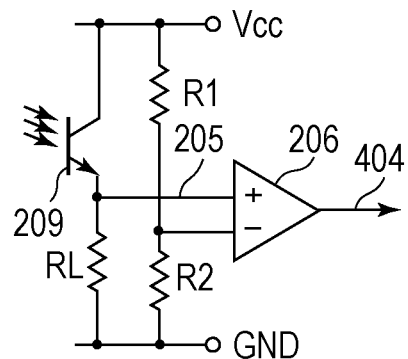

Next, a generation circuit for the reference position signal 404 will be described by using FIG. 6C.

Since the reference position signal 404 is output when the voltage 205 from the detector 204 reaches the certain threshold 208 as described above, a temporal delay derived from a response time of a photodiode 209 is caused.

Next, FIG. 2 will be described.

An A-phase voltage 401 and a B-phase voltage 402 of an orthogonal signal from the orthogonal signal detection unit 111 in the signal reading head 110 in FIG. 5 (the B-phase differs in phase from the A-phase by 90 degrees) are illustrated. In a case where the voltage 205 from the detector 204 in FIG. 6A is higher than the threshold 208, the reference position signal 404 corresponding to 1 is output, and in a case where the voltage 205 is lower than the threshold 208, the reference position signal 404 corresponding to 0 is output.

Figure 4:
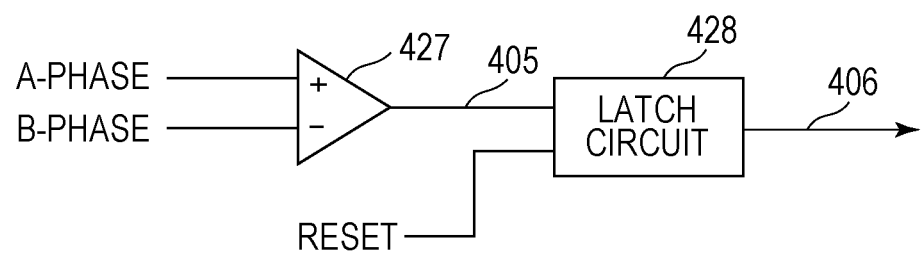
FIG. 4 is a schematic configuration diagram of a C-phase generation circuit of the encoder according to the first exemplary embodiment of the present invention.

A C-phase voltage 405 is generated on the basis of a voltage magnitude relationship based on a phase change in the A-phase voltage 401 and the B-phase voltage 402. The C-phase voltage 405 is generated by the comparison unit 421 illustrated in FIG. 1. As illustrated in FIG. 4, the comparison unit 421 is provided with a comparator 427 and a latch circuit, and the C-phase voltage 405 is generated by a circuit using the comparator 427.

Timings for waveform rising and falling of the C-phase voltage 405 require real-time properties with respect to detection of a voltage magnitude relationship of the A-phase voltage 401 and the B-phase voltage 402, and therefore, analog circuit detection by a comparator circuit is preferably employed.

The C-phase voltage 405 mentioned herein is used as a term for describing the present exemplary embodiment and is not a general term used in encoders.

Since the A-phase voltage 401 and the B-phase voltage 402 form a continuous sine waveform following the change in the relative position of the signal reading head 110 and the scale 101, a square wave is also continuously generated in the C-phase voltage 405.

According to the present exemplary embodiment, the C-phase voltage 405 is generated by the magnitude relationship of the potential difference between the A-phase voltage 401 and the B-phase voltage 402, but the configuration is not limited to this method. For example, the C-phase voltage 405 may be generated by comparison of the A-phase voltage 401 and an arbitrary DC voltage. Similarly, the C-phase voltage 405 may be generated by comparison of the B-phase voltage 402 and an arbitrary DC voltage.

Figure 2:
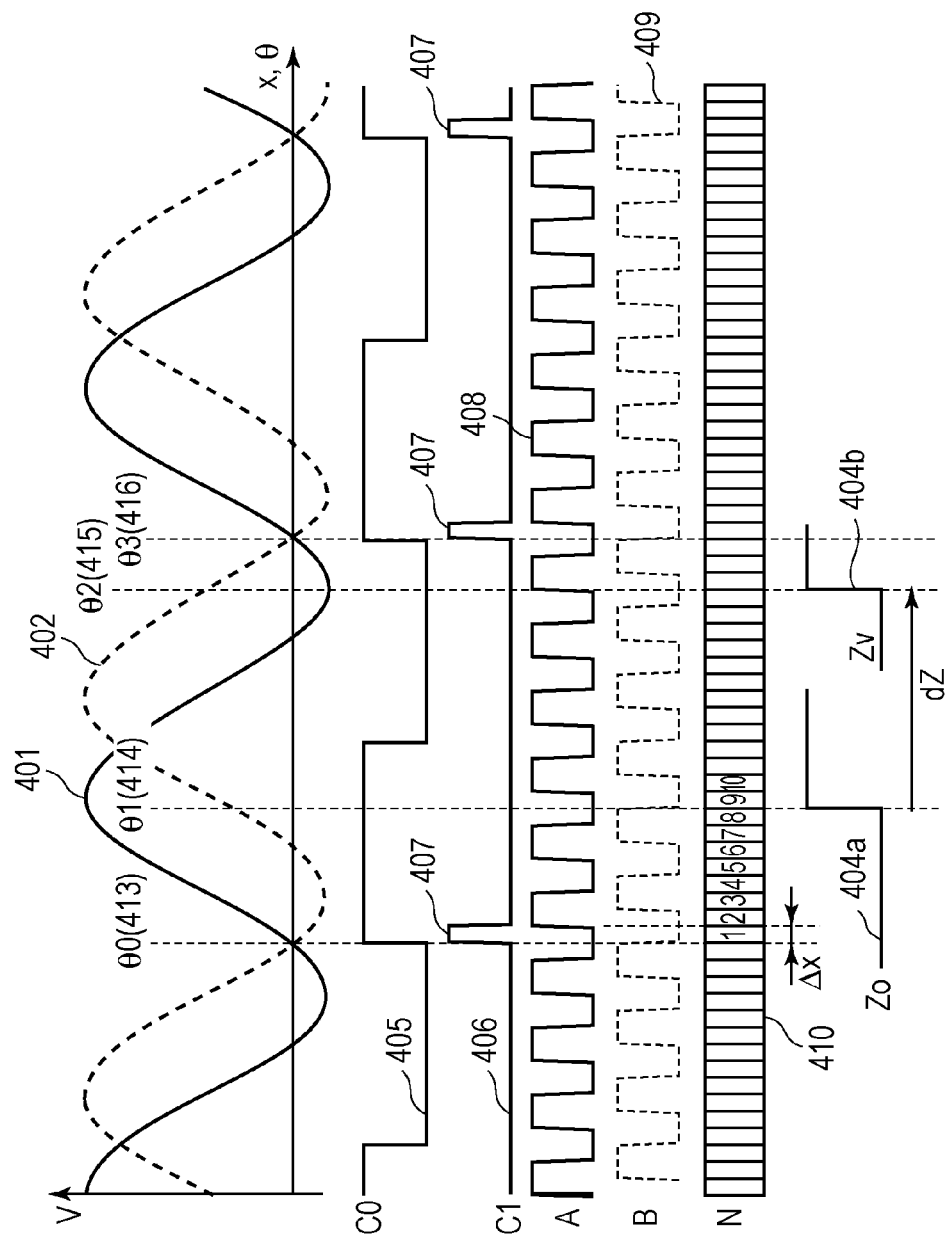
FIG. 2 is a signal waveform diagram of the encoder according to the first exemplary embodiment of the present invention.

In FIG. 2, the A-phase voltage 401 is illustrated as the waveform with a phase leading that of the B-phase voltage 402 by 90 degrees, but the B-phase voltage 402 may have a waveform with a phase leading that of the A-phase voltage 401 by 90 degrees.

In a general incremental encoder, the phase relationship between the A-phase voltage 401 and the B-phase voltage 402 is a positive direction movement in a case where the A-phase voltage 401 leads the B-phase voltage 402 by 90 degrees and is a negative direction movement in a case where the B-phase voltage 402 leads the A-phase voltage 401 by 90 degrees on the basis of a sign of a relative movement direction of the scale 101 and the signal reading head 110.

A C1-phase signal 406 is generated as a pulse waveform by using the latch circuit at the time of a waveform rising event of the C-phase voltage 405, and a timing when the above-described pulse waveform rises is set as an origin candidate signal 407. A voltage waveform of the C-phase voltage 405 is a continuous square wave following the change in the relative position of the signal reading head 110 and the scale 101.

For that reason, a plurality of origin candidate signals 407 can be generated as the C1-phase signals 406 by a circuit using the comparator 427 (origin candidate signal generation unit configured to generate a plurality of origin candidate signals in accordance with the position or the angle of the movable body from the orthogonal signal).

According to the present exemplary embodiment, the origin candidate signals 407 are generated at the time of the event of the rising of the C-phase voltage 405, but the configuration is not limited to this. The origin candidate signals 407 may be generated at the time of an event of falling of the C-phase voltage 405.

An incremental count 410 is counted by an incremental counter formed in an incremental signal generation unit (orthogonal encoder) in the encoder controller 420.

Specifically, an A-phase pulse wave 408 and a B-phase pulse wave 409 are generated so as to have a 90-degree phase difference in accordance with a sign of the relative movement direction of the scale 101 and the signal reading head 110 and generated in conformity to the phase relationship between the A-phase voltage 401 and the B-phase voltage 402.

The incremental count 410 is counted at the time of the respective waveform rising and falling events of the A-phase pulse wave 408 and the B-phase pulse wave 409. One count of the incremental count 410 corresponds to a relative movement distance $\Delta x$ of the signal reading head 110 and the scale 101.

According to the present exemplary embodiment, the configuration is adopted in which, when the A-phase voltage 401 and the B-phase voltage 402 complete 360-degree phase rotations, the A-phase pulse wave 408 and the B-phase pulse wave 409 output 6 square waves each, and 24 of the incremental counts 410 are counted, but this configuration is an example, and the numbers are not limited to the above.

An origin detection sequence will be described by using FIG. 1.

The origin detection sequence corresponds to a sequence in which an origin signal is generated from the plurality of origin candidate signals 407 by using the reference position signal 404, and also the $\Delta CZ$ value corresponding to the difference in the incremental count 410 between the reference position signal 404 and the most recent C1-phase signal 406 for detecting the reference position signal 404 is output. In a generally commercially available incremental encoder, a response time for the Z-phase signal relevant to the reference position signal 404 according to the present exemplary embodiment is slower than response times for the A-phase voltage 401 and the B-phase voltage 402 output from the orthogonal signal detection unit 111.

This delay occurs because the detection element and the waveform generation circuit are different from each other since the orthogonal signal detection unit 111 and the reference position signal detection unit 112 output waveforms used for different purposes.

For example, when a response time for the Z-phase signal by an encoder head SR-P200 commercially available by Canon Marketing Japan Inc. is measured, in a case where the reference position signal pattern 102 of the scale 101 is moved to a reading position of the signal reading head 110 in the order from the non-reflective section 106 to the reflective section 107, a falling edge of the Z-phase signal has a response time delay of approximately 80 μsec on average.

In a case where origin reset using a general Z-phase signal, which corresponds to a related art technology, is performed in the above-described SR-P200, for example, when origin detection is performed while a relative movement speed of the signal reading head 110 and the scale 101 is set as 1 m/sec, an origin position shift of approximately 80 μm occurs as compared with the origin position in a case where the relative movement speed is sufficiently low.

In addition, the response time delays for the A-phase voltage 401 and the B-phase voltage 402 are sufficiently small with respect to the response time delay for the Z-phase signal. For this reason, it is possible to perform high-accuracy high-speed origin detection while the origin is set by using the origin candidate signal 407 generated on the basis of the A-phase voltage 401 and the B-phase voltage 402.

According to the present exemplary embodiment, the incremental encoder in which the response time delays for the A-phase voltage 401 and the B-phase voltage 402 are sufficiently smaller than the response time delay for the reference position signal 404 is used.

Figure 1:
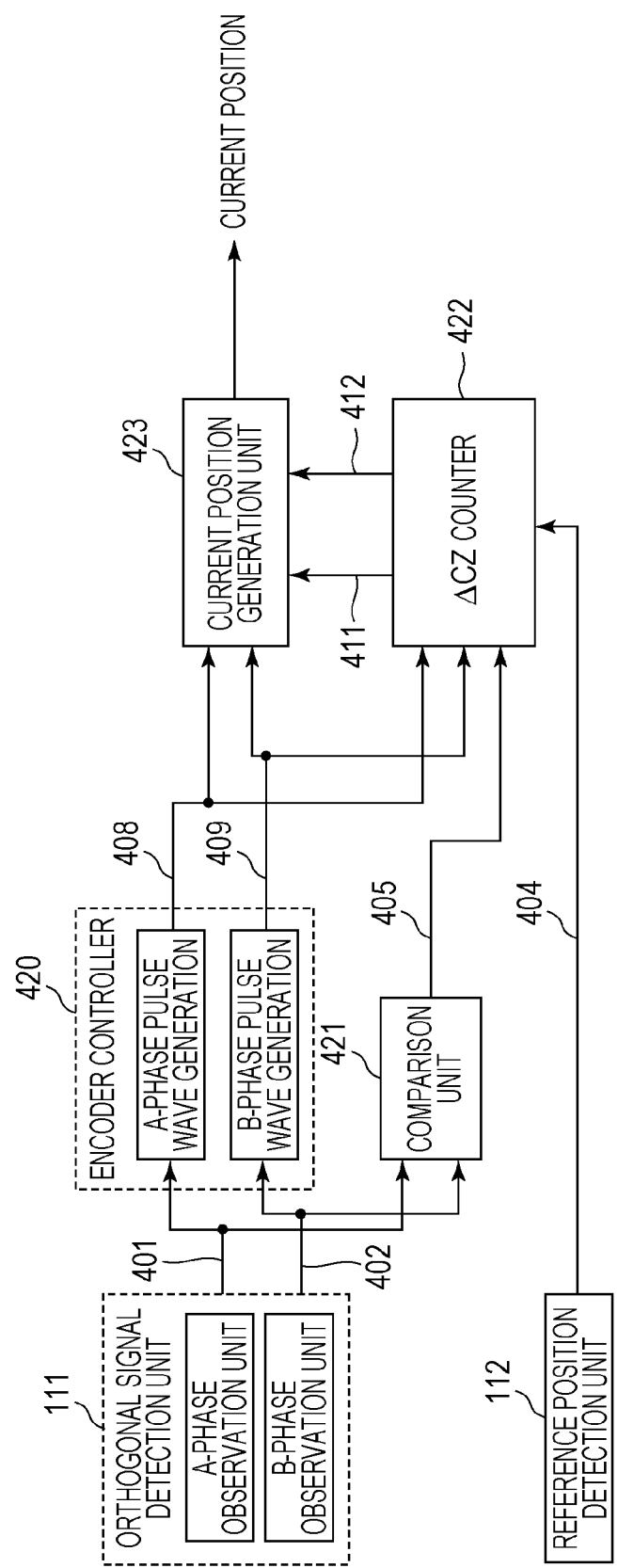
FIG. 1 is a schematic configuration diagram for describing an origin detection sequence of an encoder according to a first exemplary embodiment of the present invention.

For the description of FIG. 1, the A-phase voltage 401 and the B-phase voltage 402 which are from the orthogonal signal detection unit 111 are both connected to the encoder controller 420 and the comparison unit 421. The comparison unit 421 outputs the C1-phase signal 406 by the above-described circuit using the comparator 427 and the latch circuit 428 described above by using FIG. 4, to be connected to the $\Delta CZ$ counter 422.

The A-phase pulse wave 408 and the B-phase pulse wave 409 which are output from the orthogonal signal pulse wave generation unit of the encoder controller 420 are both connected to the $\Delta CZ$ counter 422 and the current position generation unit 423. The reference position signal 404 output by the reference position signal detection unit 112 is connected to the $\Delta CZ$ counter 422.

Figure 3:
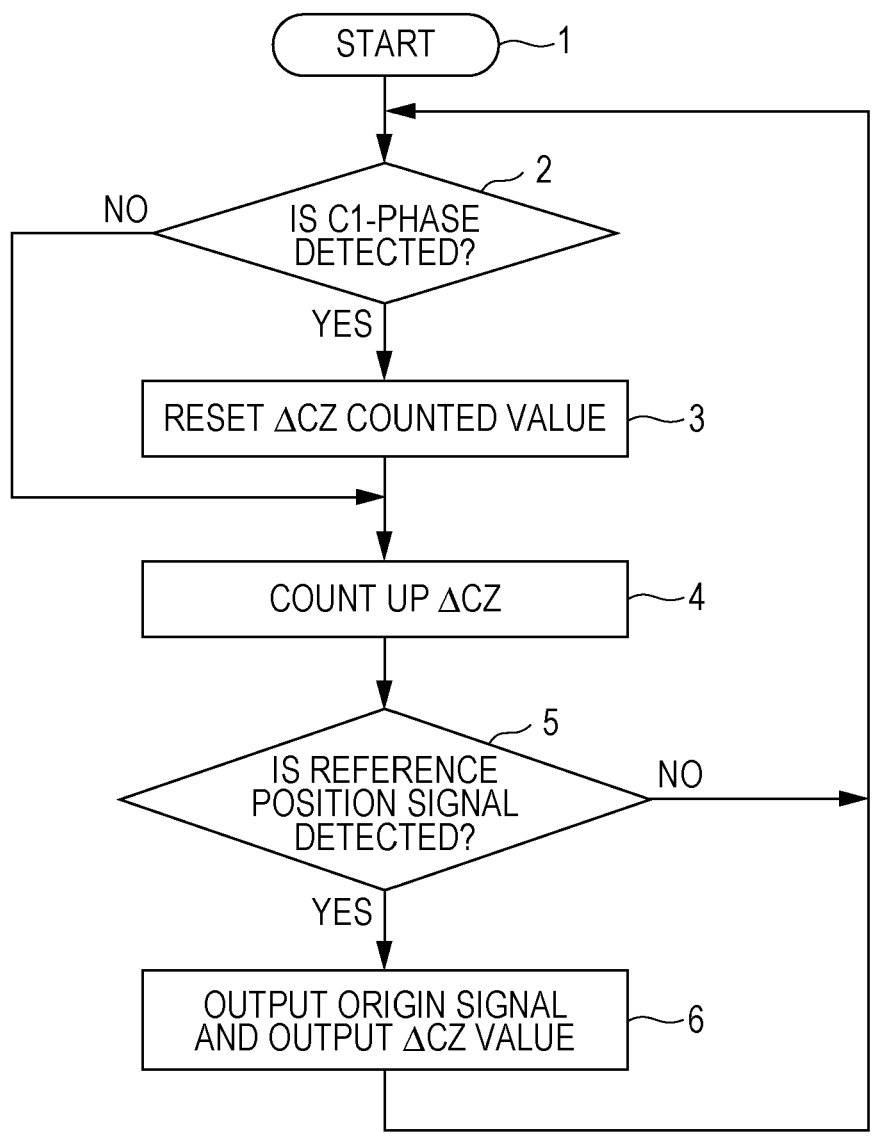
FIG. 3 is a flow chart of ΔCZ counter of the encoder according to the first exemplary embodiment of the present invention.

The $\Delta CZ$ counter 422 will be described by using FIG. 3.

The presence or absence of the origin candidate signal 407 in the C1-phase signal 406 is determined. According to the present exemplary embodiment, the determination is made upon the rising event of the origin candidate signal 407 by the origin signal generation unit configured to generate the origin from the plurality of origin candidate signals on the basis of the reference position signal.

In a case where the origin candidate signal 407 is detected, the $\Delta CZ$ counter 422 is reset as the $\Delta CZ$ count=0, and the $\Delta CZ$ counter 422 is counted up in accordance with increase and decrease of the incremental count 410.

According to the present exemplary embodiment, since the above-described $\Delta CZ$ counter is reset each time the origin candidate signal is detected, it is sufficient if the $\Delta CZ$ counter can count up to 24 counts.

A reference position signal 404a is a waveform in a case where the relative movement speed of the signal reading head 110 and the scale 101 is sufficiently low. According to the present exemplary embodiment, a detection position of the reference position signal 404a is detected at the ninth count when counting is performed by using the incremental count 410 from the most recent origin candidate signal 407.

The above-described detection position of the reference position signal 404a has an error due to a pattern preparation accuracy of the scale 101, a mounting position accuracy of the orthogonal signal detection unit 111 and the reference position signal detection unit 112 arranged inside the signal reading head 110, and a gradient accuracy in the apparatus mounting of the signal reading head 110 and the scale 101. Therefore, individual differences in terms of the individual encoder configurations exist.

A $\Delta CZ$ value 412 corresponding to the difference in the incremental count 410 between the origin candidate signal 407 obtained at the time of the detection of the reference position signal 404 as described above and the reference position signal 404 and an origin signal 411 are output to the current position generation unit 423.

The current position generation unit 423 counts the incremental count 410 by another counter (incremental counter formed in the orthogonal encoder), which is different from the $\Delta CZ$ counter, on the basis of the A-phase pulse wave 408 and the B-phase pulse wave 409.

In a case where the origin signal 411 output by the $\Delta CZ$ counter 422 is detected, resetting is performed so as to set the incremental count 410=the $\Delta CZ$ value 412 instead of the resetting to set the above-described incremental count 410=0, which is general in the related art technology.

Next, the relative movement speed of the signal reading head 110 and the scale 101 is increased to such a relative movement speed that a rising edge of a reference position signal 404b is detected between the most recent origin candidate signal 407 in a case where the above-described relative movement speed is sufficiently low and the next origin candidate signal 407 after this most recent origin candidate signal 407.

In a case where the relative movement speed is increased, a shift of the detection position as represented by the reference position signal 404b occurs in proportion to the increase in the speed.

According to the present exemplary embodiment, a detection position of the reference position signal 404b is detected at the 22nd count when counting is performed by using the incremental count 410 provided to the $\Delta CZ$ counter 422 from the most recent origin candidate signal 407.

Similarly as described above, the $\Delta CZ$ value 412 corresponding to the difference in the incremental count 410 between the origin candidate signal 407 obtained at the time of the detection of the reference position signal 404 and the reference position signal 404 as well as the origin signal 411 are output to the current position generation unit 423, and resetting is performed in the current position generation unit 423 to set the incremental count 410=the $\Delta CZ$ value 412.

According to the present exemplary embodiment, the example using the optical encoder has been described, but the configuration is not limited to the optical encoder. For example, a magnetic encoder may be used.

According to the present exemplary embodiment, even when the relative movement speed of the signal reading head 110 and the scale 101 is increased, the same origin 413 is to be set.

For this reason, the relative movement speed of the signal reading head 110 and the scale 101 is a relative movement speed in a range where the reference position signal 404a and the reference position signal 404b are detected by a timing θ3 (416) at which the next origin candidate signal 407 after the A-phase voltage 401 and the B-phase voltage 402 complete the 360-degree phase rotation is detected after the origin candidate signal 407 in the origin 413 is detected.

With the above-described configuration and method, it is possible to perform the high-accuracy and high-speed origin reset equivalent to the origin reset in a case where the relative movement speed of the signal reading head 110 and the scale 101 is sufficiently low, and it is possible to confirm that the satisfactory origin reset in which the origin position error derived from the above-described relative movement speed is small can be performed.

Second Exemplary Embodiment

Figure 7:
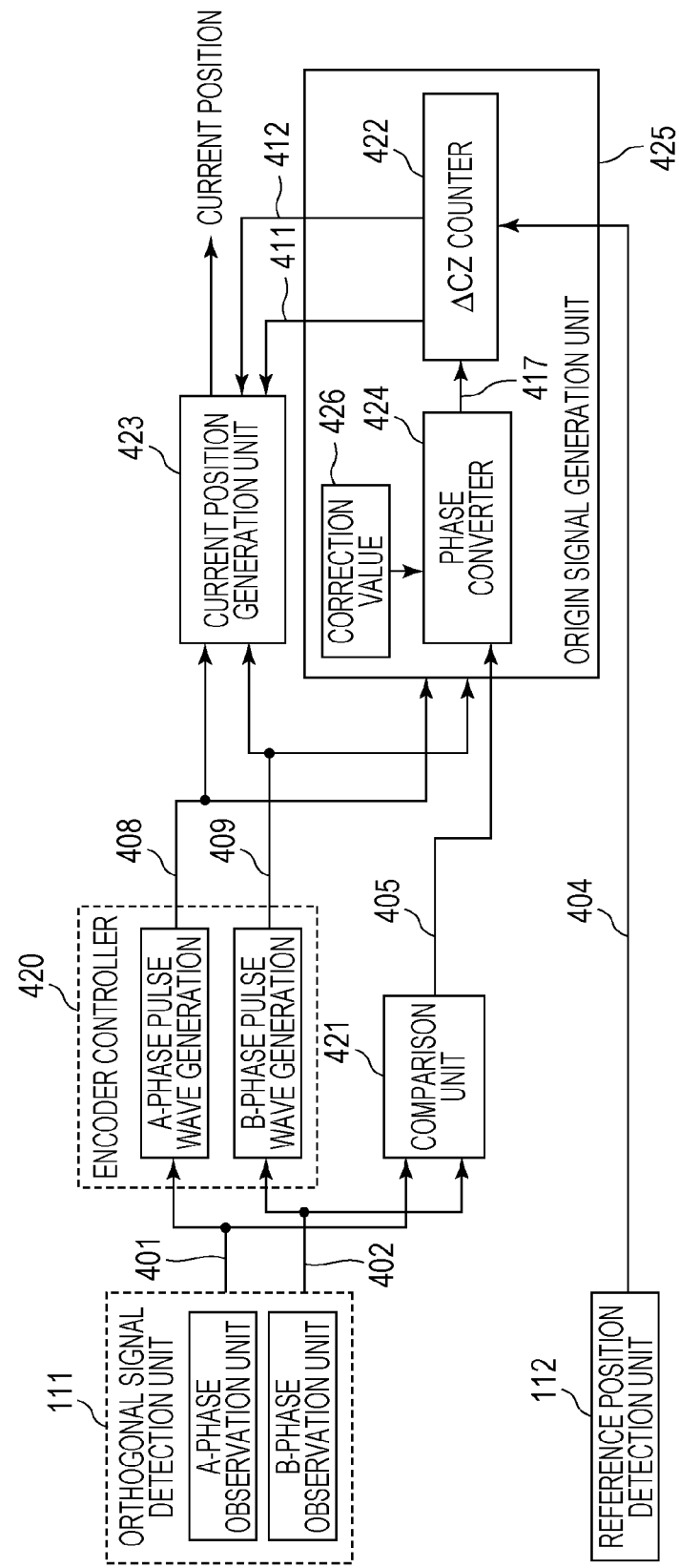
FIG. 7 is a schematic configuration diagram for describing an example configuration of an encoder according to a second exemplary embodiment of the present invention.
Figure 8:
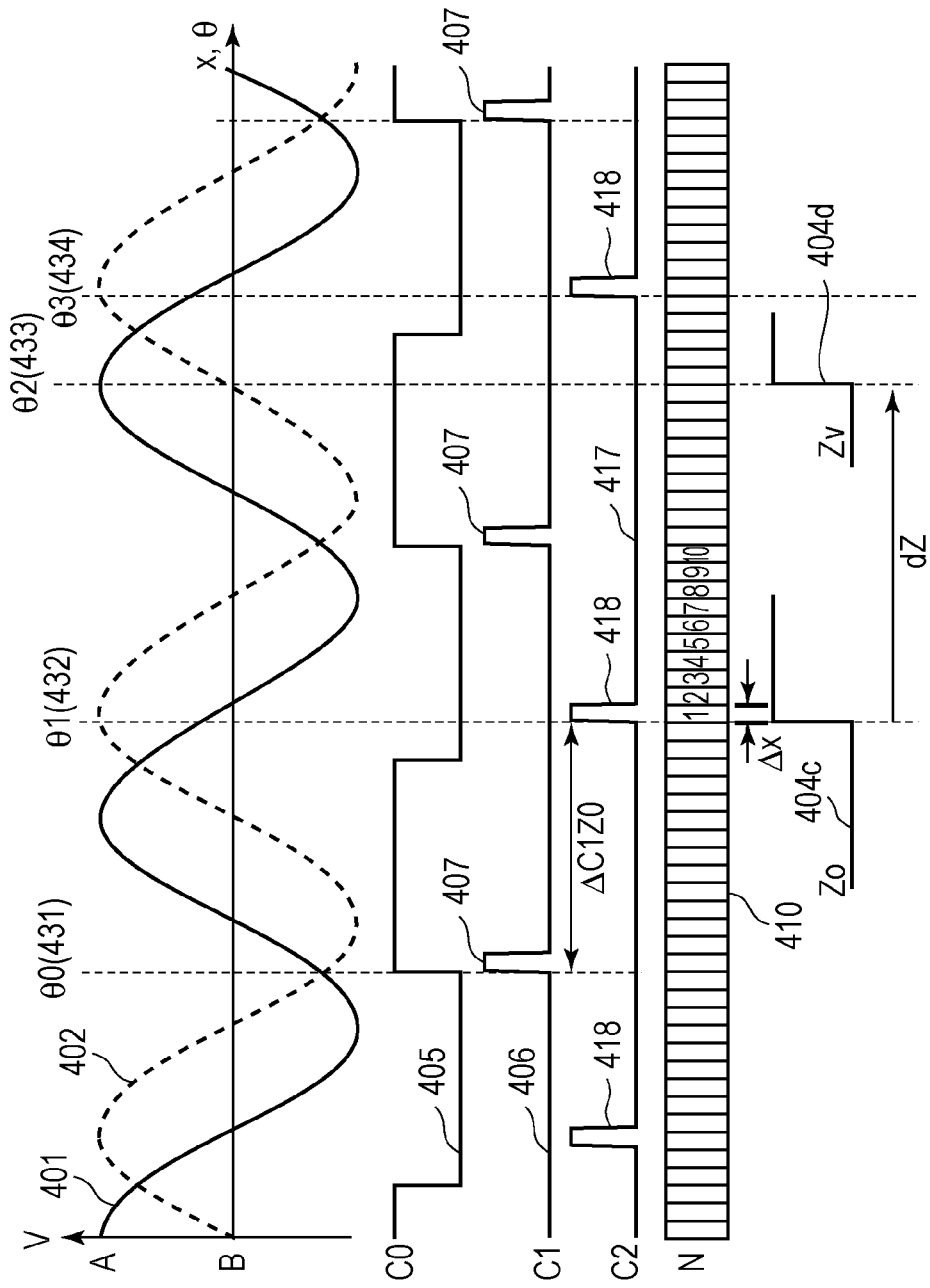
FIG. 8 is a signal waveform diagram of the encoder according to the second exemplary embodiment of the present invention.

According to a second exemplary embodiment, with regard to an example configuration of an encoder having a different mode from the first exemplary embodiment, differences from the first exemplary embodiment will be described by using FIG. 7 and FIG. 8.

The configuration according to the first exemplary embodiment has the following problem derived from the individual differences of the encoder configurations.

The detection position of the reference position signal 404a has an error due to the following respective accuracies.

That is, the error occurs because of the pattern preparation accuracy of the scale 101, the mounting position accuracy of the orthogonal signal detection unit 111 and the reference position signal detection unit 112 arranged inside the signal reading head 110, the gradient accuracy in the apparatus mounting of the signal reading head 110 and the scale 101, and the like. For this reason, the individual differences in terms of the individual encoder configurations exist.

In order that the origin 413 is unchanged even when the relative movement speed of the signal reading head 110 and the scale 101 is increased, the reference position signal 404a and the reference position signal 404b are to have the same origin candidate signal 407. For that reason, a problem occurs that the same relative movement speed as the other individual piece may not to be used depending on a combination of the signal reading head 110 and the scale 101.

A configuration in which the above-described problem is solved will be described according to the present exemplary embodiment.

A difference of the present exemplary embodiment resides in that the $\Delta CZ$ counter 422 in the configuration described according to the first exemplary embodiment is replaced by an origin signal generation unit 425. The origin signal generation unit 425 is provided with the $\Delta CZ$ counter 422, a memory 426 that stores a phase correction value, and a phase converter 424 configured to output the C1-phase signal 406 as an origin candidate signal 2 (417) in which the phase is shifted to an arbitrary shift by the above-described phase correction value.

When the origin candidate signal 407 of the C1-phase signal 406 is detected, the phase converter 424 performs counting until the incremental count 410 reaches the phase correction value and outputs an origin candidate 2 (418).

According to the present exemplary embodiment, the origin candidate signal 407 in the C1-phase signal 406 is generated each time the incremental count 410 reaches 24 counts. For this reason, the phase correction value is set as 24 counts or lower.

The phase correction value is obtained by an actual measurement when the apparatus is started to be used.

As a specific method, $\Delta C1Z0$ corresponding to a difference in the incremental count 410 between a reference position signal 404c at the time of the phase correction value=0 in a case where the relative movement speed of the signal reading head 110 and the scale 101 is a sufficiently low speed and the most recent origin candidate signal 407 is counted to be set as a phase correction value.

Since $\Delta C1Z0$ according to the present exemplary embodiment is 14 counts, the phase correction value=14 is set. For this reason, the origin according to the present exemplary embodiment is $\theta 1$ (432).

The memory 426 has a configuration using a non-volatile memory such that once setting is made, re-setting is not required after turning a main power supply ON and OFF, but the configuration is not limited to this.

In a case where the relative movement speed is increased, a shift of the detection position occurs in proportion to the increase in the speed as represented by a reference position signal 404d.

According to the present exemplary embodiment, a detection position of the reference position signal 404d is detected at the 19th count when counting is performed from the most recent origin candidate 2 (418) by using the incremental count 410 provided in the $\Delta CZ$ counter 422.

Similarly as in the first exemplary embodiment, the $\Delta CZ$ value 412 corresponding to the difference in the incremental count 410 between the origin candidate 2 (418) obtained at the time of the detection of the reference position signal 404 and the reference position signal 404 as well as the origin signal 411 are output to the current position generation unit 423. Subsequently, resetting is performed so as to set the incremental count 410=the $\Delta CZ$ value 412 in the current position generation unit 423.

According to the present exemplary embodiment, the example using the optical encoder has been described, but the configuration is not limited to the optical encoder. For example, a magnetic encoder may be used.

With the above-described configuration and method, it is possible to perform the high-accuracy and high-speed origin reset equivalent to the origin reset in a case where the relative movement speed of the signal reading head 110 and the scale 101 is sufficiently low, and also it is possible to confirm that the origin reset at a high relative movement speed at which the problem derived from the individual differences of the encoder configurations does not occur can be performed.

Third Exemplary Embodiment

According to a third exemplary embodiment, example configurations of an encoder to which the present invention is applied and an origin calculation method for the encoder will be described by using FIG. 9.

In the following explanation, um represents a millionth of 1 m, and us represents a millionth of 1 second.

Figure 9:
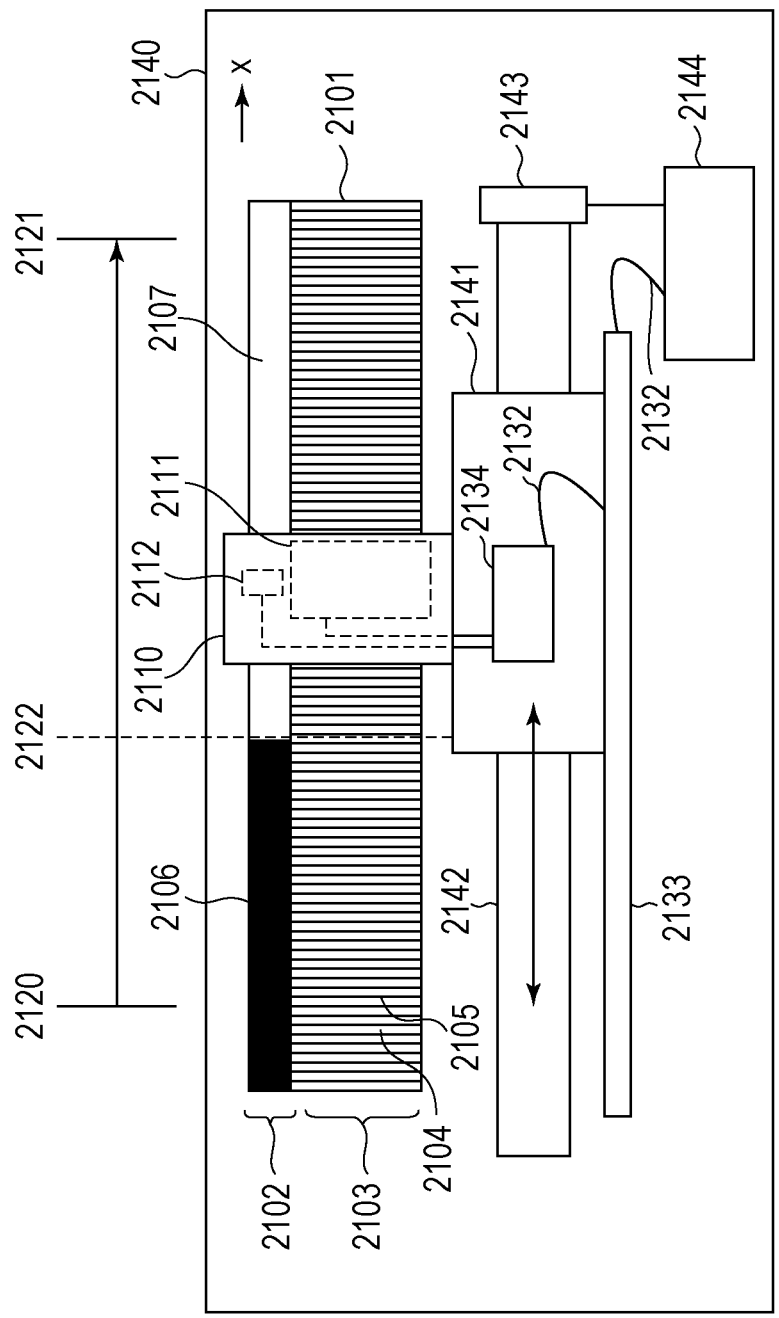
FIG. 9 is an explanatory diagram for describing an example configuration of an encoder according to a third exemplary embodiment of the present invention.

In FIG. 9, a scale 2101, a reference position signal pattern 2102, and an orthogonal signal pattern 2103 are illustrated. A non-reflective section 2106 that is a part of the reference position signal pattern 2102 and a reflective section 2107 that is a part of the reference position signal pattern 2102 also illustrated. A non-reflective section 2104 that is a part of the orthogonal signal pattern 2103 and a reflective section 2105 that is a part of the orthogonal signal pattern 2103 are also illustrated. The orthogonal signal pattern 2103 repeats the same pattern every $\lambda$ [m]. A boundary portion 2122 is at between the non-reflective section 2106 and the reflective section 2107 of the reference position signal pattern 2102.

A signal reading head 2110, an orthogonal signal detection unit 2111 (position signal generation unit configured to generate an orthogonal signal in accordance with a displacement of a position or an angle of the movable body), and a reference position signal detection unit (origin detection unit configured to generate an origin signal in a case where the movable body is at a predetermined position) 2112 are illustrated.

A linear guide 2142 is fixed onto a stand 2140.

The signal reading head (movable body) 2110, a slider (movable body) 2141 that moves on the linear guide 2142, and the slider 2141 and the signal reading head 2110 are connected to each other.

The scale 2101 is fixed to the stand 2140.

A motor 2143 is coupled to the slider 2141 by a ball screw and a guide block that moves on the ball screw which are not illustrated in the drawing, and a rotational motion of the motor 2143 is converted into a linear motion of the slider 2141.

An encoder controller 2134 is connected to the orthogonal signal detection unit 2111 and the reference position signal detection unit 2112.

As will be described by using FIG. 12, the encoder controller 2134 includes an orthogonal encoder 2401, a speed calculation unit 2403, a memory 2406, a reset signal generation unit 2405, and a current position generation unit 2409.

The encoder controller 2134 is configured to generate a current position counter 2303, a speed excess signal 2408, and a Z-phase detection signal 2411.

A stage controller 2144 is connected to the motor 2143 and the encoder controller 2134 and moves the slider 2141 to a desired position. A cable 2132 is arranged inside Cableveyor (registered trademark) 2133, and even when the slider 2141 is moved, the encoder controller 2134 and the stage controller 2144 can keep a connected state.

Since the stage controller 2144 has a function of rotating the motor 2143 at a predetermined revolution in an arbitrary direction, it is possible to drive the slider 2141 in a positive direction or a negative direction at a substantially constant speed.

A direction in which the slider 2141 is guided is set as an X axis, and a direction of an arrow is set as a positive direction.

Figure 10A:
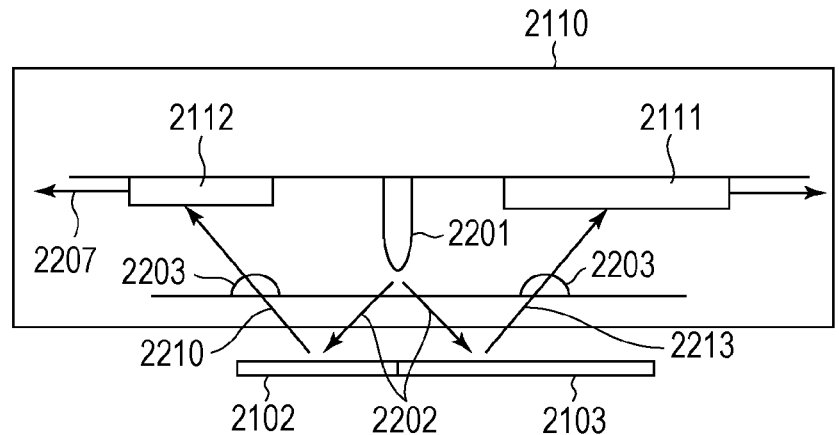
FIGS. 10A to 10C are explanatory diagrams for describing an origin signal detection unit and an orthogonal signal detection unit of the encoder according to the third exemplary embodiment of the present invention.

FIG. 10A is a schematic diagram for describing the reference position signal detection unit 2112 and the orthogonal signal detection unit 2111.

Illumination light 2202 from a light source 2201 is reflected by the reference position signal pattern 2102, and its reflected light 2210 is introduced to the reference position signal detection unit 2112 by a lens 2203 or another appropriate optical element to generate a Z-phase 2207.

Figure 10B:
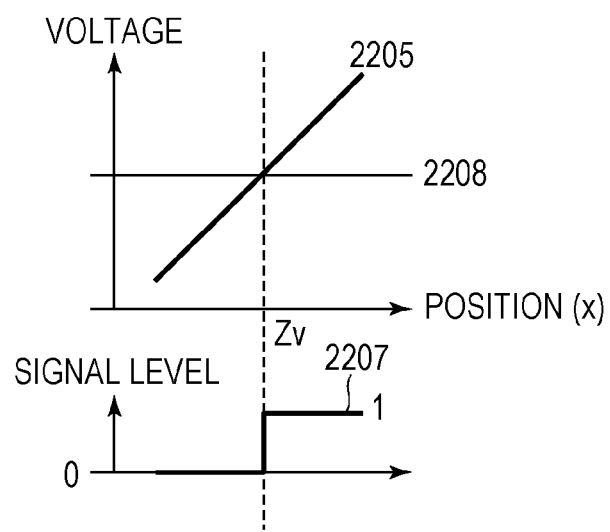
Figure 10C:
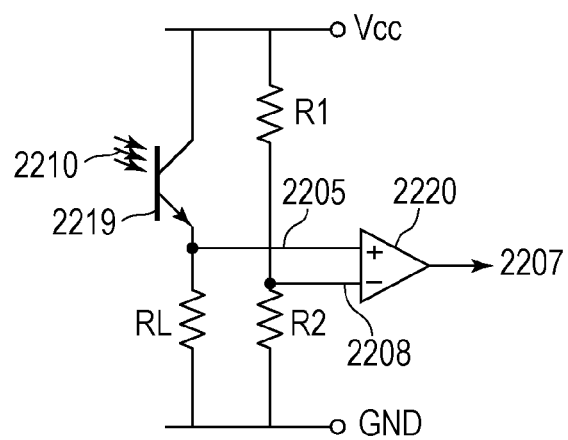

FIG. 10C is a schematic diagram for describing the reference position signal detection unit 2112.

The reflected light 2210 is received by a phototransistor 2219, and a generated voltage 2205 is compared with a reference voltage 2208 by a comparator 2220 and taken out as the digitalized Z-phase 2207.

The Z-phase 2207 is configured to output 0 when the reflected light 2210 is reflected by the non-reflective section 2106 and output 1 when the reflected light 2210 is reflected by the reflective section 2107.

FIG. 10B is a schematic diagram for describing the Z-phase 2207 when the slider 2141 moves in the positive direction through the boundary portion 2122.

At this time, the Z-phase 2207 changes from 0 to 1. This position where the Z-phase 2207 changes is set as a Z-phase detection position (Zv), and a speed thereof is set as a Z-phase detection speed (Vz).

In FIG. 10A, the illumination light 2202 from the light source 2201 is reflected by the orthogonal signal pattern 2103, and its reflected light 2213 is introduced to the orthogonal signal detection unit 2111 by the lens 2203 or another appropriate optical element to generate AB-phases 2212. A circuit in the related art is used as the circuit that generates the AB-phases 2212.

A method of generating a position of the slider 2141 from the Z-phase 2207 and the AB-phases 2212 will be described in FIG. 11 and FIG. 9.

In FIG. 9, the slider 2141 starts driving from a reference position detection start position 2120, passes through the boundary portion 2122, and travels to a reference position detection end position 2121 to stop, and an arbitrary speed can be selected for the speed at which the slider 2141 passes through the boundary portion 2122 (the Z-phase detection speed (Vz)). The series of driving corresponds to the origin detection sequence. At this time, the position of the slider 2141 is not confirmed at the reference position detection start position 2120, but when the slider 2141 passes through the boundary portion 2122, the position of the slider 2141 is initialized at a certain position, it is possible to accurately supply the position of the slider 2141 thereafter.

Figure 11:
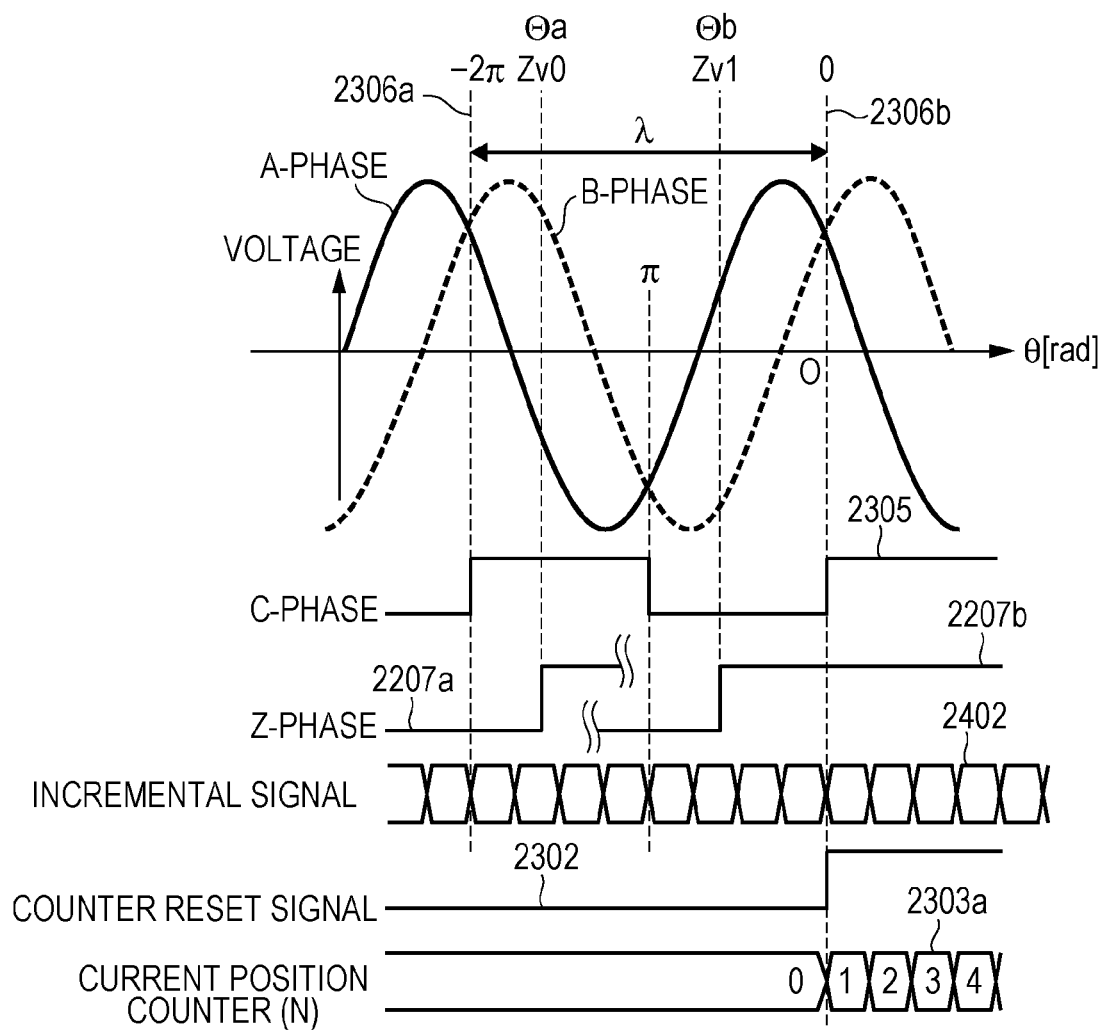
FIG. 11 is an explanatory diagram for describing a counter reset signal of the encoder according to the third exemplary embodiment of the present invention.

In FIG. 11, when a horizontal axis takes phases of the AB-phases 2212, and a vertical axis takes a voltage, its voltage profile is sinusoid and is set as an orthogonal signal in which the B-phase is retarded with respect to the A-phase by $\pi/2$ [rad].

Herein, a phase functioning as a reference of this orthogonal signal is a phase in which voltages of the AB-phases are equally positive and is set as an origin candidate signal (phase).

Among the origin candidate signals (phases), in a case where the origin detection sequence is executed at a sufficiently slow speed in the positive direction, the origin candidate signal (phase) immediately after the Z-phase 2207 is detected is set as an origin signal (phase) 2306b.

A C-phase will be described. A C-phase 2305 is a digital signal that is output by comparing the voltages of the AB-phases 2212 to each other and outputs 0 when the A-phase voltage is lower than the B-phase voltage and outputs 1 when A-phase voltage is higher than the B-phase voltage. A relationship between the Z-phase 2207 and the origin detection speed (Vz) will be described. The Z-phase 2207 in a case where the origin detection speed (Vz) is sufficiently low is denoted by 2207a, and the Z-phase 2207 in a case where the origin detection speed (Vz) is not sufficiently low (V1) is denoted by 2207b. Respective phases of the Z-phase detection position (Zv) are denoted by $\theta a$ and $\theta b$.

Response times of the orthogonal signal detection unit 2111 and the reference position signal detection unit 2112 will be described. The response time of the reference position signal detection unit 2112 refers to a time from the light irradiation on the reference position signal detection unit 2112 from the reflective section 2107 until the Z-phase signal 2207 turns to 1.

This time is mainly determined by response times of the phototransistor 2219 and the comparator 2220.

The response time of the orthogonal signal detection unit 2111 refers to a time from the projection of the orthogonal signal pattern 2103 on the orthogonal signal detection unit 2111 until the AB-phases 2212 or the orthogonal signal set to have a higher resolution by phase division from the AB-phases 2212 is output.

At this time, the orthogonal signal detection unit 2111 and the response time of the reference position signal detection unit 2112 are different from each other in general, and when the reference position detection speed (Vz) is changed, the Z-phase detection position (Zv) is also changed.

When the response times of the reference position signal detection unit 2112 and the orthogonal signal detection unit 2111 are respectively set as $\tau Z$ and $\tau AB$, and the change of the phase is set as $\Delta\theta$, it is possible to represent $\Delta\theta$ by the following Expression 1.

$$\Delta\theta = ((\tau Z - \tau AB)/\lambda)*2\pi*Vz \qquad \text{Expression 1}$$

The response times can be obtained from data sheets of the elements and experiments.

FIG. 11 illustrates a case where $\tau Z$ is larger than $\tau AB$.

For example, in a case where the following expressions are satisfied:

$$\tau Z - \tau AB = 100 \text{ us} \qquad \text{Expression 2;}$$

$$Vz = 0.5 \text{ m/s} \qquad \text{Expression 3; and}$$

$$\lambda = 80 \text{ um} \qquad \text{Expression 4,}$$

$\theta a$ and $\theta b$ are different in distance after conversion from each other by approximately $$100 \text{ us}*0.5 \text{ m/s} = 50 \text{ um}.$$

At this time, when Expression 1 is calculated, $\theta a$ and $\theta b$ are different from each other by $((100 \text{ us}*0.5 \text{ m/s})/80 \text{ um})*2\pi = 5\pi/4$ [rad]. Herein, the origin signal 2306b in which a counter reset signal 2302 is set as the origin candidate signal (phase) immediately after the Z-phase detection position (Zv) is generated, and subsequent incremental signals 2402 are counted. Accordingly, even when the Z-phase detection speed (Vz) is changed, unless the Z-phase detection position ($\theta b$) skips the reference phase 2306b, the current position counter 2303 is reset by the origin signal 2306b corresponding to the same origin candidate signal (phase) every time, and it is therefore possible to calculate the current position (origin) at a satisfactory reproducibility.

Figure 12:
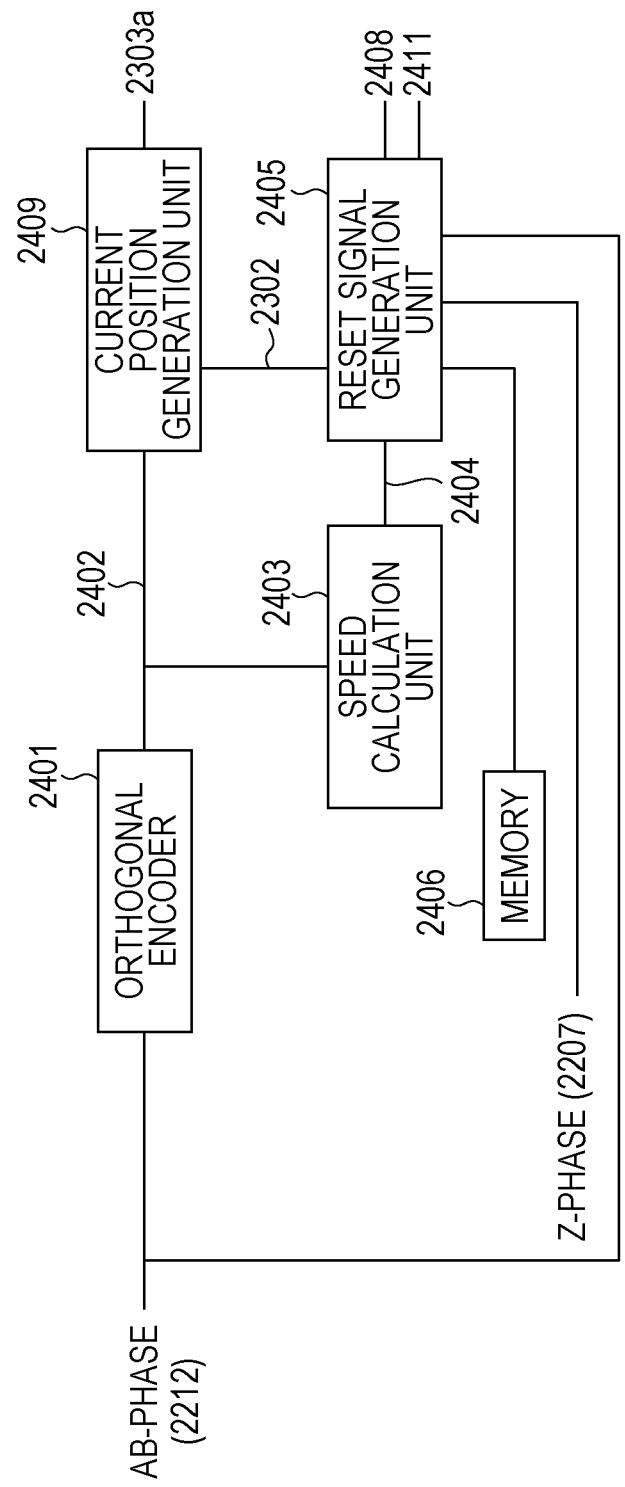
FIG. 12 is a block diagram for describing an example configuration of an encoder controller according to the third exemplary embodiment of the present invention.

FIG. 12 is a block diagram for describing a configuration of the encoder controller 2134. In FIG. 12, an orthogonal encoder 2401 constitutes an incremental signal generation unit configured to generate an incremental signal of a position or an angle from the orthogonal signal, and the AB-phases 2212 are converted into the incremental signal 2402 by the orthogonal encoder 2401.

Subsequently, the incremental signal 2402 is input to the speed calculation unit 2403 to generate a speed signal 2404. With this speed calculation unit, it is possible to determine an excess of a threshold, which will be described next, from the speed at the time of the detection of the origin candidate signal which is obtained from the orthogonal signal.

A memory (storage unit) 2406 holds a unique origin signal (phase) and the like.

The reset signal generation unit 2405 generates the counter reset signal 2302 from the speed signal 2404 and the phase (θa) stored in the memory 2406 and also generates the speed excess signal 2408 by a speed excess signal generation unit formed in the reset signal generation unit. The reset signal generation unit 2405 further generates a Z-phase detection signal 2411.

Since the speed excess signal 2408 is generated in a case where θb corresponding to the threshold exceeds the origin signal (phase) 2306b, the speed excess signal 2408 is generated in the case of the following Expression 5.

$$2\pi \leq \theta a + ((\tau Z - \tau AB)/\lambda)*2\pi*Vz \qquad \text{Expression 5}$$

The Z-phase detection signal 2411 becomes effective when the Z-phase detection position (Zv) is detected.

A current position generation unit 2409 counts the incremental signals 2402 after the counter reset signal 2302 is input therein and generates a current position counter (N).

Figure 13:
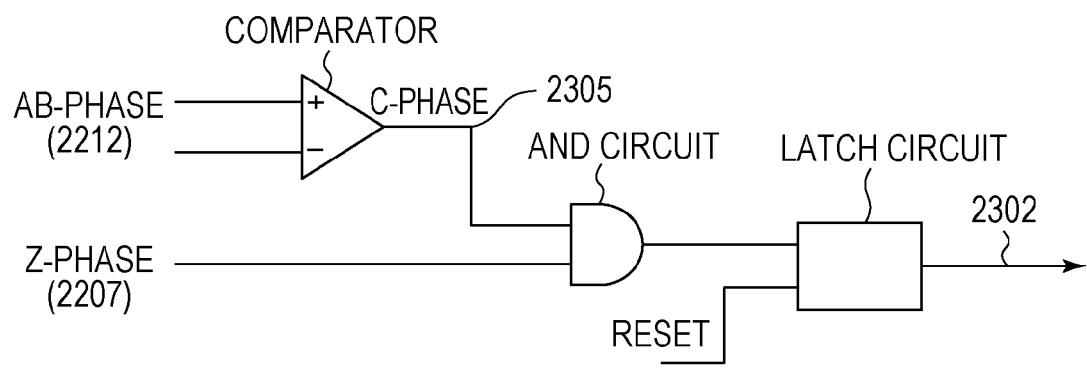
FIG. 13 is an explanatory diagram for describing the counter reset signal according to the third exemplary embodiment of the present invention.

The reset signal generation unit 2405 will be described in FIG. 13.

The AB-phases 2212 are input to the comparator to generate the C-phase 2305. The C-phase 2305 is input to an AND circuit with the Z-phase 2207 and further passes through the latch circuit, so that the counter reset signal 2302 is generated.

When the reference position detection sequence is executed as described above, the current position counter 2303 can be initialized by the origin signal (phase) 2306b corresponding to the same origin candidate signal (phase) even when the reference position detection speed (Vz) is changed, and it is therefore possible to accurately calculate the current position (origin).

When the origin detection sequence is executed in this manner, even when the reference position detection speed (Vz) is changed, the current position counter can be accurately output. Even in a case where the reference position detection signal (phase) (θb) skips the origin signal (phase) 2306b, it is possible to detect the excess by the speed excess signal 2408. Thus, it is possible to avoid the driving based on the erroneous position information thereafter.

Fourth Exemplary Embodiment

According to a fourth exemplary embodiment, an example configuration in which, when the speed excess signal is output from the speed excess signal generation unit, the origin detection speed is adjusted to perform the origin detection again will be described by using FIG. 14.

In addition to the third exemplary embodiment, a function of decreasing the Z-phase detection speed (Vz) in a case where the speed excess signal 2408 is generated and performing the Z-phase detection sequence again according to the fourth exemplary embodiment.

Figure 14:
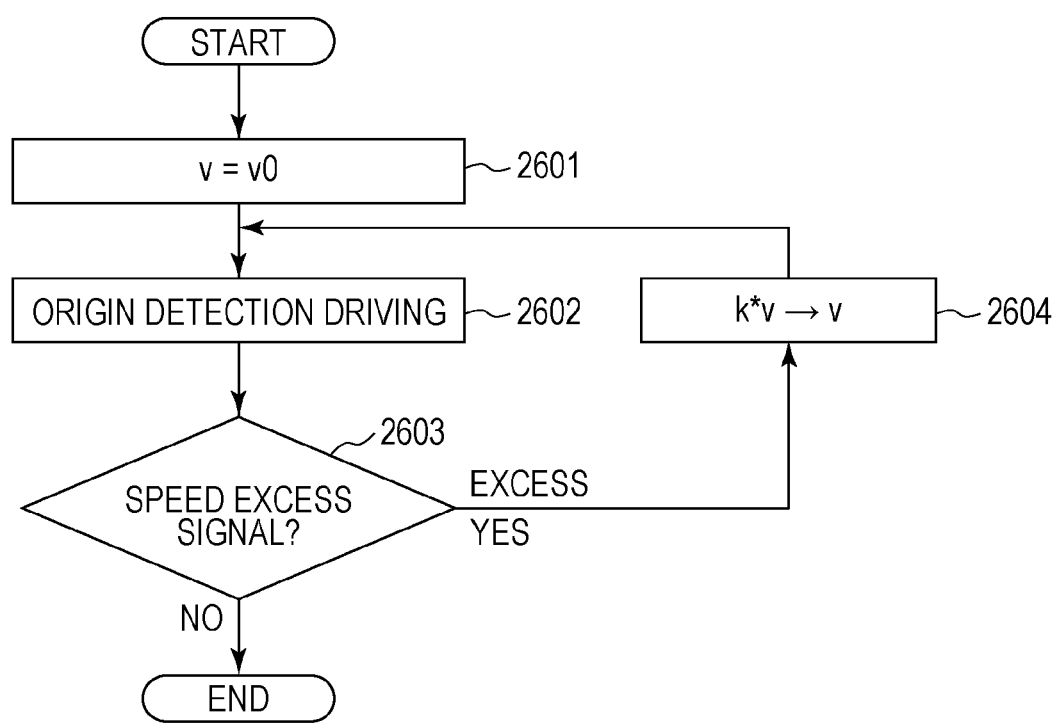
FIG. 14 is an explanatory diagram for describing an origin detection sequence of an encoder according to a fourth exemplary embodiment of the present invention.

In FIG. 14, in 2601, V0 is set as an initial value of the Z-phase detection speed (Vz), and the Z-phase detection sequence is performed in 2602. As a result, in the case of the speed excess (YES in 2603), the Z-phase detection speed is multiplied by K (K<1) in 2604, and while the Z-phase detection sequence is repeatedly performed again, the process can be ended when the speed is decreased so as not to be determined as the speed excess (NO in 2603).

When the above-described mode is adopted, it is possible to accurately detect the reference position.

Fifth Exemplary Embodiment

An example configuration according to a fifth exemplary embodiment will be described by using FIG. 15 and FIG. 16.

Figure 15:
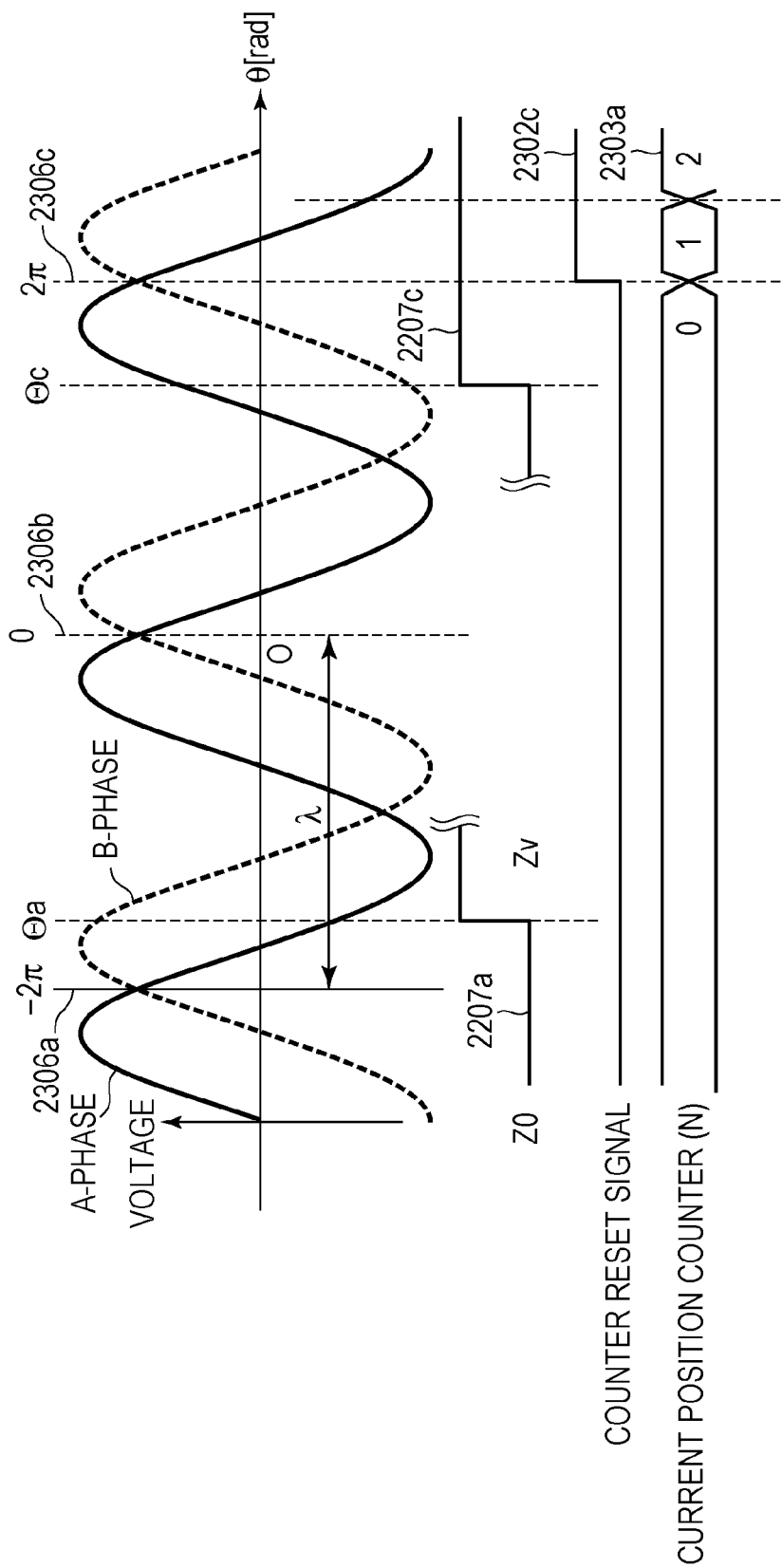
FIG. 15 is an explanatory diagram for describing a counter reset signal of the encoder according to the fifth exemplary embodiment of the present invention.

FIG. 15 is an explanatory diagram for describing a case where the Z-phase detection position is beyond the origin signal (phase) 2306b.

In this case, the Z-phase 2207 turns to 2207c, and the Z-phase detection position is at a position θc skipping the origin signal (phase) 2306b.

In this case, the counter is initialized by an origin signal (phase) (2306c) corresponding to an origin candidate signal immediately after θc, and when counts equivalent to λ are added to the current position counter, it is possible to accurately calculate the current position (origin) similarly as in the case where the current position counter is initialized by the origin signal (phase) 2306b.

Similarly, a consideration is given of a case where the origin candidate signal (phase) is skipped by M times, when this is represented by the following expression:

$$(2+2M)\pi \leq \theta a + ((\tau Z - \tau AB)/\lambda)*2\pi*Vz < (4+2M)\pi \qquad \text{Expression 6,}$$

while a current position is represented by pos, and a counted value equivalent to λ is set as Nλ, pos can be calculated by the following expression:

$$pos = N + M*N\lambda \qquad \text{Expression 7.}$$

Figure 16:
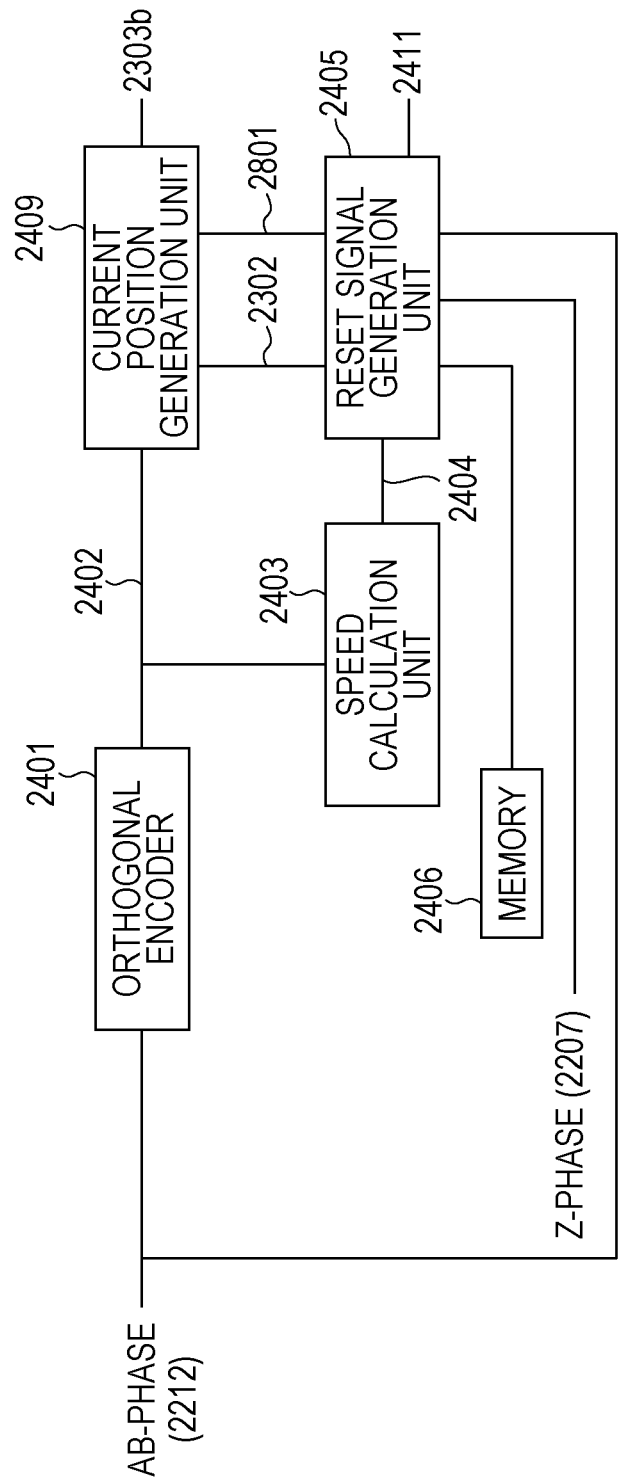
FIG. 16 is a block diagram for describing an example configuration of an encoder controller according to the fifth exemplary embodiment of the present invention.

FIG. 16 is a block diagram for describing an example configuration of the encoder controller 2134 according to the fifth exemplary embodiment.

In FIG. 16, the speed excess signal 2408 is deleted, and an offset amount 2801 is added as compared with FIG. 12. The current position generation unit 2409 outputs the current position counter 2303b obtained by adding M*Nλ to the current position counter 2303 that integrates the incremental signals 2402.

Sixth Exemplary Embodiment

An example configuration according to a sixth exemplary embodiment will be described by using FIG. 17.

Figure 17:
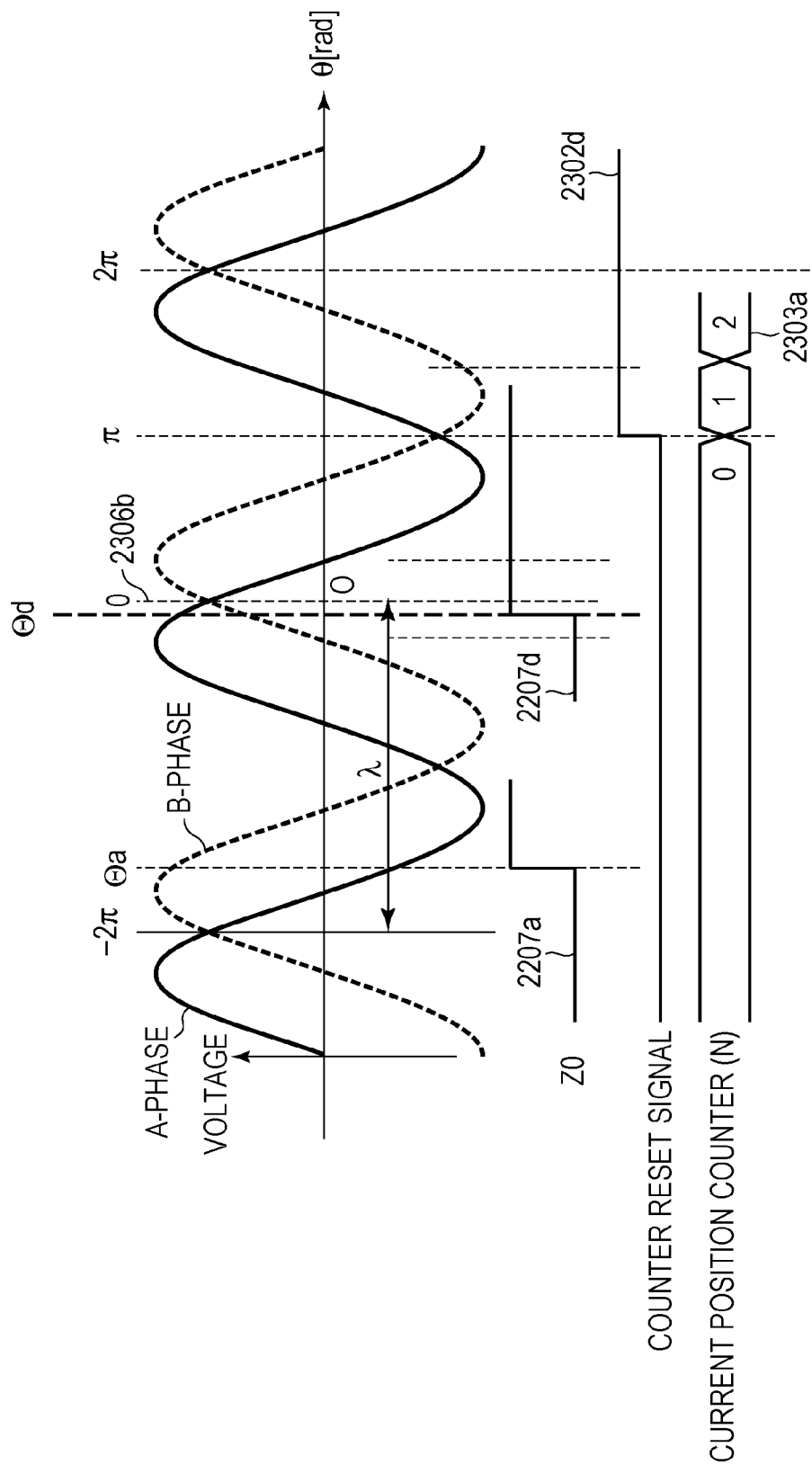
FIG. 17 is an explanatory diagram for describing a counter reset signal of an encoder according to a sixth exemplary embodiment of the present invention.

FIG. 17 schematically represents a case where the Z-phase detection position (θd) is in the vicinity of the origin signal (phase) 2306b.

In a case where the Z-phase detection position (θd) is in the vicinity of the origin signal (phase), a calculation error for the speed signal 2404, and τZ and τAB slightly fluctuate because of an environment temperature or the like, and an error occurs in the calculation for the number (M times) of skips over the origin signal (phase). As a result, the current position (origin) may be erroneously calculated in some cases.

For that reason, according to the present exemplary embodiment, in a case where the reference position signal skips the origin signal (phase), the current position counter is initialized by a different phase by π [rad] from the origin signal (phase).

In this case, when the counter reset signal 2302 turns to 2302d, and the current position is set as pos, pos can be represented by the following expressions:

$$(1+2M)\pi \leq \theta a + ((\tau Z - \tau AB)/\lambda)*2\pi*Vz < (3+2M)\pi \qquad \text{Expression 8; and}$$

$$pos = N + (M + \tfrac{1}{2})*N\lambda \qquad \text{Expression 9.}$$

Seventh Exemplary Embodiment

An example configuration according to a seventh exemplary embodiment will be described by using FIG. 18.

Figure 18:
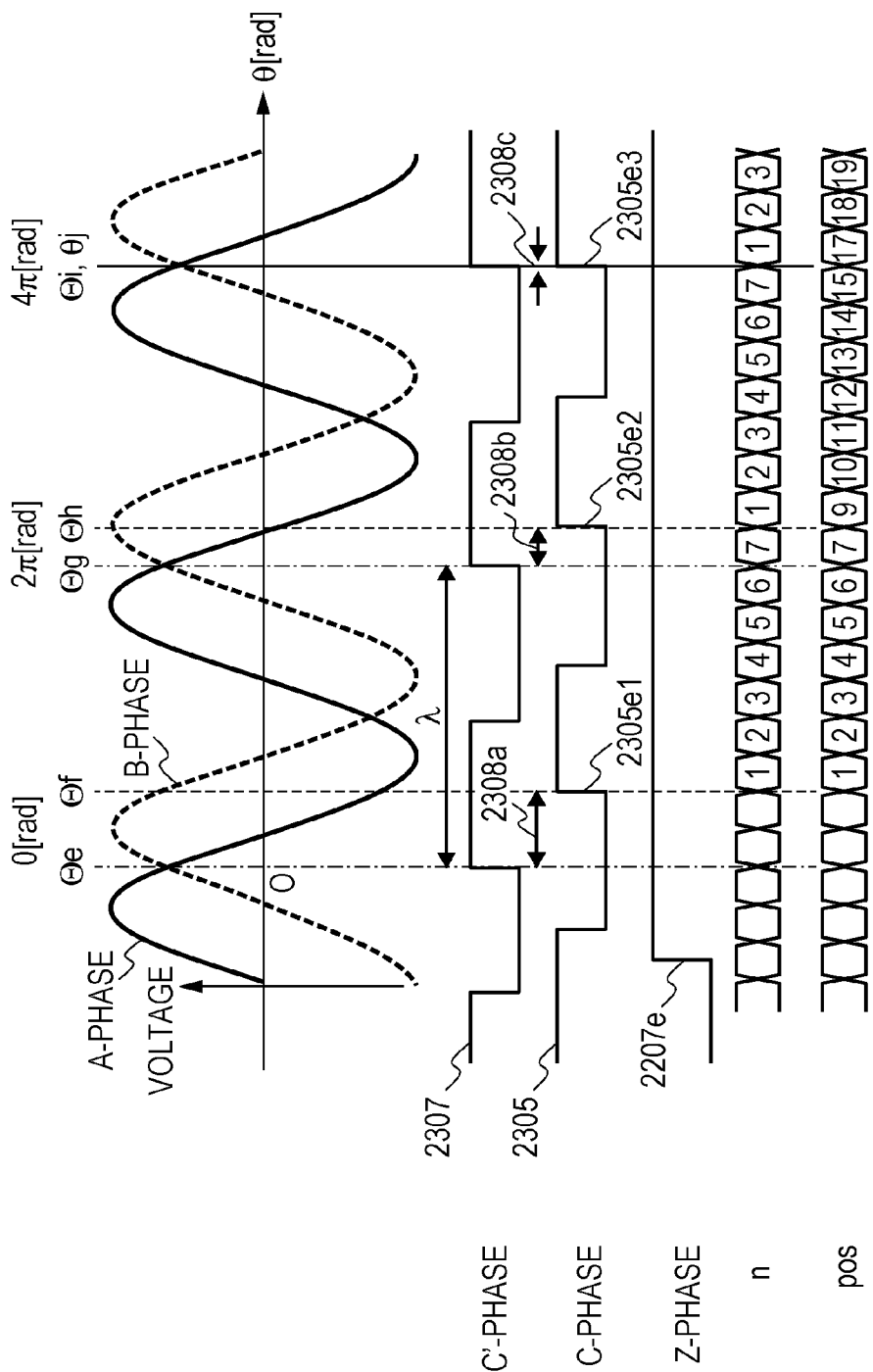
FIG. 18 is an explanatory diagram for describing a counter reset signal of an encoder according to a seventh exemplary embodiment of the present invention.

FIG. 18 schematically represents a case where the size of τAB*Vz is large enough to be non-negligible to a required measurement accuracy.

Herein, a C-phase signal to be electrically output is denoted by 2305, and a C-phase signal in a case where τAB is supposed to be 0 is set as C'-phase 2308.

For example, FIG. 18 illustrates a case where the C-phase signal should be output at the original phase θe but is output at a phase θf since τAB*Vz is large. In FIG. 18, errors equivalent to two counts (2308a and 2308b) occur.

In such a case, the current position counter may be set as a predetermined value by the C-phase signal until Vz becomes small, that is, the speed of the slider is decreased to a sufficiently low speed.

That is, when the number of the C-phase signals after the Z-phase detection is set as Nc, and a counted number from the last C-phase detection is set as n, pos can be represented by the following expression:

$$pos = Nc*N\lambda + n \qquad \text{Expression 10.}$$

In FIG. 18, the error 2308a exists at the time of the first C-phase detection after a Z-phase 2207e is detected. However, when the speed is decreased, the error is reduced to a level of the error 2308b (θg, θh) at the time of the second C-phase detection, and at the time immediately before the stop, the error is reduced to a level of an error 2308c that is negligible (θi, θj).

Eighth Exemplary Embodiment

Figure 19:
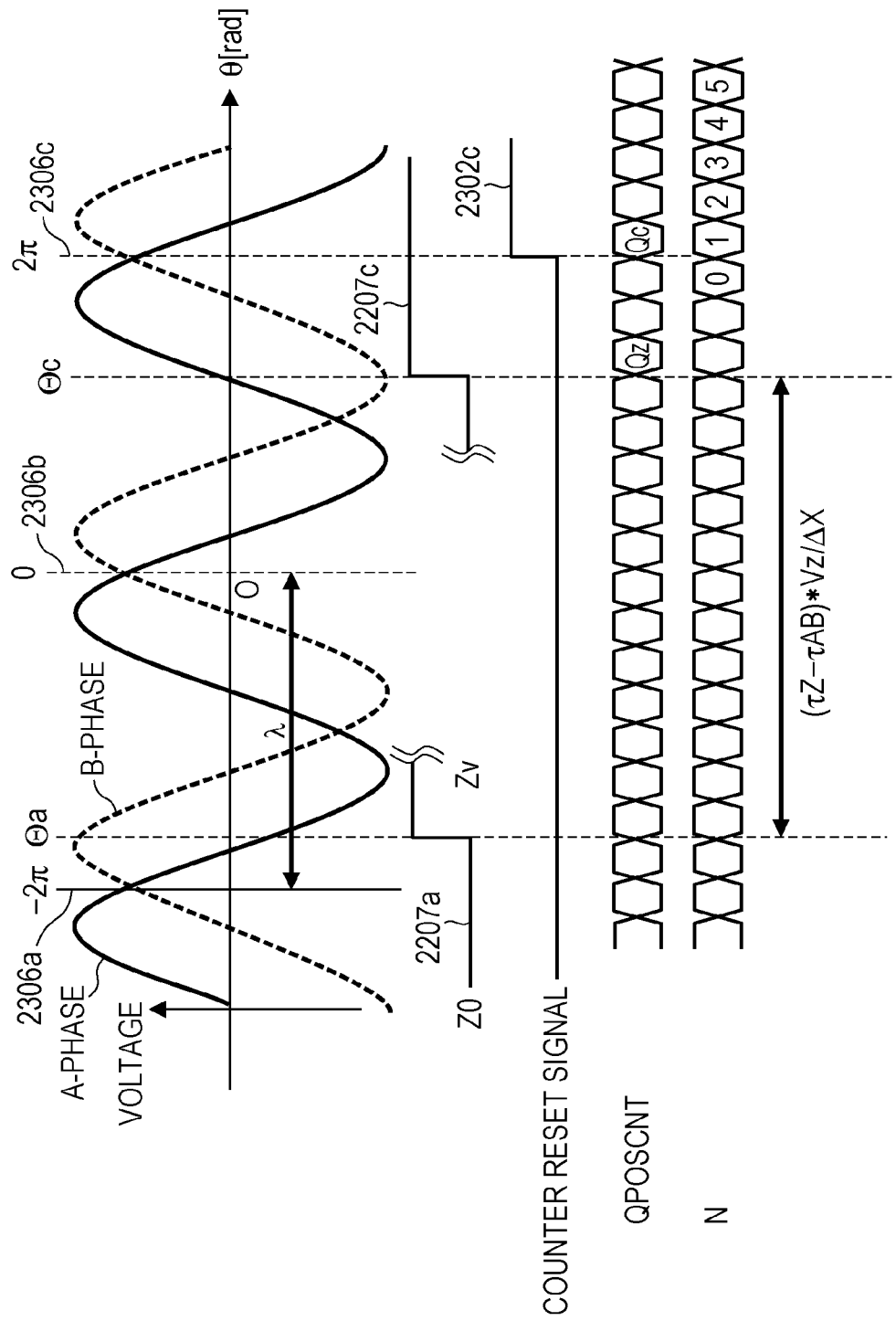
FIG. 19 is an explanatory diagram for describing a counter reset signal of an encoder according to an eighth exemplary embodiment of the present invention.

An example configuration according to an eighth exemplary embodiment will be described by using FIG. 19. The configurations similar to those of FIG. 15 are assigned with the same reference numerals, and descriptions thereof will be omitted.

A counter that is continuously counted is set as QPOSCNT, QPOSCNT at a time when the Z-phase (2207C) is detected is set as Qz, and QPOSCNT at a time when the C-phase (2302C) is detected is set as Qc.

Furthermore, when a distance at which QPOSCNT changes by 1 is set as ΔX [m], the following expression is established:

$$Qz0 = Qz - (\tau Z - \tau AB)*Vz/\Delta X \qquad \text{Expression 11.}$$

Moreover, a constant K is defined, the following expressions are established:

$$dZ = K*(\tau Z - \tau AB)*Vz/\Delta X \qquad \text{Expression 12;}$$

$$Qz0p = Qz0 + dZ \qquad \text{Expression 13; and}$$

$$Qz0m = Qz0 - dZ \qquad \text{Expression 14.}$$

At that time, an integer M which satisfies the following expression is calculated:

$$Qz0m \leq Qc - N\lambda * M + \theta a < Qz0p \qquad \text{Expression 15.}$$

Then, the current position is calculated as follows:

$$pos = N + M*N\lambda \qquad \text{Expression 16}$$

where 0≤K<1.

K is a constant determined by sizes of fluctuations of τZ and τAB and a calculation error of Vz, and a representative constant is approximately 0.2.

According to the exemplary embodiments of the present invention, it is possible to realize the encoder that can perform the stable origin detection even in a case where the origin detection is detected at a relatively high speed and the origin calculation method for the encoder with which the accurate origin calculation can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-169806, filed Aug. 19, 2013, and Japanese Patent Application No. 2013-181856, filed Sep. 3, 2013 which are hereby incorporated by reference herein in their entirety.

What is claimed is:

1. An encoder that detects a position of a movable body by using an incremental signal based on A-phase and B-phase voltages, the encoder comprising:

an encoder controller including an A-phase pulse wave generation unit and a B-phase pulse wave generation unit; and a reference position signal reading unit configured to read a reference position signal pattern, wherein the encoder obtains an origin using an incremental count, which is generated based on an A-phase pulse wave generated by the A-phase pulse wave generation unit and a B-pulse wave generated by the B-phase pulse wave generation unit, and the read reference signal pattern.

2. The encoder according to claim 1, wherein the encoder controller causes a comparison unit configured to compare a magnitude relationship between the A-phase and B-phase voltages to generate an origin candidate signal, and resets the incremental count based on detection of the origin candidate signal.

3. The encoder according to claim 2, wherein the comparison unit is formed by a comparator and a latch circuit.

4. The encoder according to claim 2, wherein the origin candidate signal is subjected to phase correction based on the incremental signal.

5. The encoder according to claim 2, further comprising a counter configured to set the origin candidate signal immediately after the reference position signal signal pattern is detected as a unique origin and reset a counted value of the incremental signal.

6. The encoder according to claim 5, further comprising a speed excess signal generation unit configured to detect a speed at the time of detection of the origin candidate signal generate a speed excess signal when the speed exceeds a threshold.

7. The encoder according to claim 6, wherein a reference position detection speed is decreased in a case where the speed excess signal is output.

8. The encoder according to claim 6, further comprising a storage unit configured to hold the unique origin, wherein a counted value from the stored unique origin until the origin candidate signal immediately after the reference position signal is detected is added to the counted value of the incremental signal.

9. The encoder according to claim 5, wherein the counted value of the incremental signal is initialized by the unique origin.

10. The encoder according to claim 5, further comprising a unit configured to calculate the number of times when the reference position signal skips the origin candidate signal.

11. The encoder according to claim 1, wherein the encoder is an optical encoder or a magnetic encoder.

\* \* \* \* \*